(No Model.)
S. A. KERNS & W. SEHNERT.
RIDING LISTER.
No. 539,519. Patented May 21, 1895.
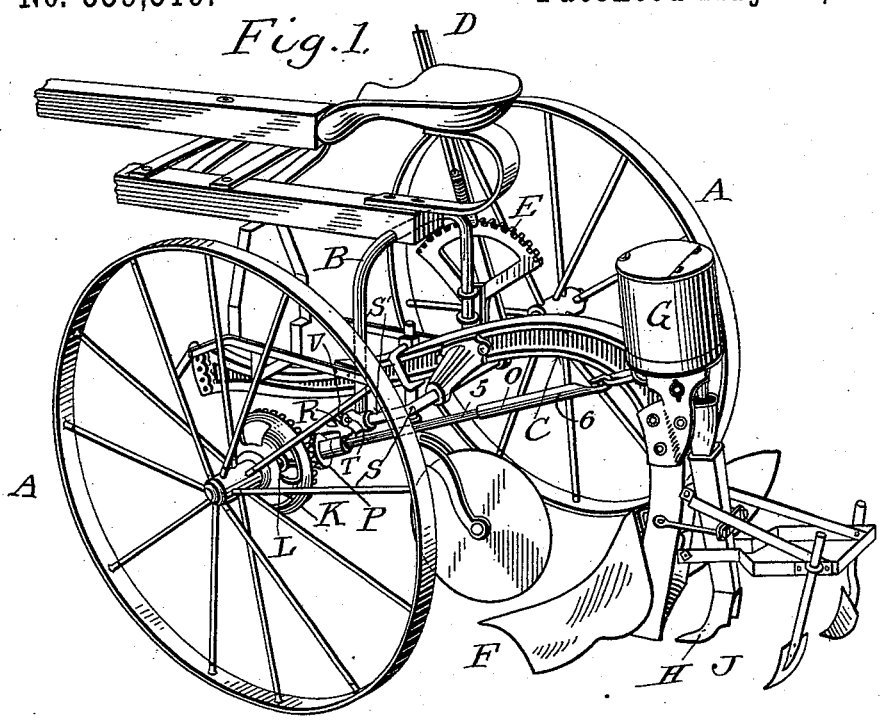
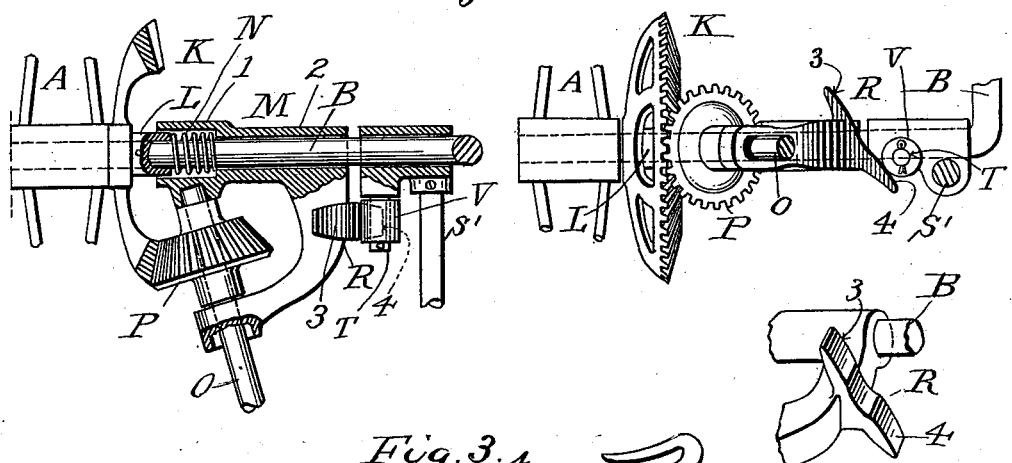
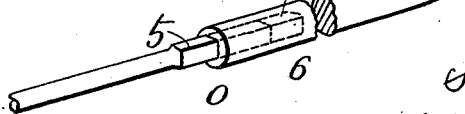
Witnesses
C. C. Burdine
E. B. Bull
Inventor
Simon A. Kerns,
William Sehnert.
per John G. Manahan Attorney

UNITED STATES PATENT OFFICE.

SIMON A. KERNS AND WILLIAM SEHNERT, OF ROCK ISLAND, ILLINOIS, ASSIGNORS TO THE ROCK ISLAND PLOW COMPANY, OF SAME PLACE.

RIDING-LISTER.

SPECIFICATION forming part of Letters Patent No. 539,519, dated May 21, 1895.

Application filed January 24, 1895. Serial No. 536,094. (No model.)

*To all whom it may concern:*

Be it known that we, SIMON A. KERNS and WILLIAM SEHNERT, citizens of the United States, residing at Rock Island, in the county of Rock Island and State of Illinois, have invented certain new and useful Improvements in Riding-Listers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention has reference to improvements in riding listers, and pertains more especially to a novel and simple provision for suspending the operation of the seeding mechanism by means of, and coincidently with, the raising of the plow. In making the many successive turns, it is necessary to raise the plow out of the earth, and also to intermit temporarily the operation of the seeding. At this precise time the matter of turning and guiding the team requires the driver's constant attention, and therefore any mechanism which will automatically and certainly disconnect the seeding devices, without requiring special attention thereto on the part of the driver, is doubly advantageous. The seeding mechanism is driven from a gear wheel seated on one of the carrying wheels of the machine. This wheel engages and rotates a smaller beveled pinion, keyed on the rotating shaft which drives the seed discharging mechanism located in the seed hopper. The front end of said shaft carrying said smaller pinion is carried on a bracketed sleeve seated on the horizontal portion of the axle of said carrying wheel, and part of our invention herein consists in novel means for causing said smaller pinion to automatically engage said driving pinion when the lister is in position for work, and for disengaging said pinions coincidently with, and by raising the plow from the ground.

Another department of our invention consists of constructing said rotating shaft in two sections, one of which is provided longitudinally with a square walled socket, and the other of which has a square exterior, adapted to be movably inserted within said socket, and to be automatically moved backward and forward therein, as the varying relative distances between the two extremities of said shaft may require.

We attain the above purposes by the use of the mechanism illustrated in the accompanying drawings, in which—

Figure 1 is a perspective of a machine embodying our invention. Fig. 2 represents details of the mechanism employed to automatically connect and disconnect the driving and seeding mechanisms. Fig. 3 is a detail view of said driving-shaft.

Similar letters and figures refer to similar parts throughout the several views.

Our invention is adapted for use in connection with any seeder in which the plow or other part connected with or carrying the seed devices, is susceptible of being raised or lowered. In this application however we exhibit and describe our invention as applied to a riding lister.

As many of the parts of our machine are well known, and their respective functions familiar, we do not deem it necessary to specifically describe such parts further than essential to explain the construction, relation, and operation of our invention.

A. A. are the usual carrying wheels which support the axle B, and one of which is utilized as a traction wheel to drive the seeding devices.

C. is the plow beam pivoted on the rocking bow S, the latter being pivotally connected at each end to the horizontal ends of the axle B.

D is a hand lever rigidly affixed to the bow S within convenient reach of the driver, and adapted to partially rotate the said bow in the usual mode, and is held in any desired position by the usual quadrant E rigidly affixed to the frame of the machine. By this means the plow beam C is raised at its rear end, and the plow F, attached thereto, raised, lowered, and suspended at will.

A seed hopper G suitably seated on the plow beam C contains the seeding mechanism by which the seed in said hopper is discharged downwardly behind a supplementary furrow opener H and subsequently covered by the rear shovels J. J. or in any suitable manner.

On the inner face of one of the wheels A, there is attached a beveled gear wheel K of a somewhat dish form, with its rim projected toward the center of the machine. On the horizontal portion of the axle B, and within gear K, there is keyed a collar L; also on the horizontal portion of the axle B inside of the collar L, there is loosely placed the bracketed sleeve M, the outer portion 1 of which is enlarged and the inner portion 2 of which is restricted. The outer end of the sleeve M is open, and adapted to pass over the inner end of the collar L. A spring N is seated on the axle B between the inner end of the collar L and the outer end of the restricted portion of the sleeve M. On the rear side of the sleeve M, there is journaled at two localities the forward portion of the shaft O, the rear end of which extends to the seed hopper G and actuates the seed mechanism therein, in any suitable mode. On the front end of the shaft O, and between the front bearings thereof, there is rigidly seated the small beveled pinion P adapted to be optionally engaged and actuated by the beveled gear K on the carrying wheel A. On the inner end of the sleeve M, there is formed a vertical cam plate R, the upper half 3 of the inner face of which recedes toward the carrying wheel A, and the lower half 4 of which said face extends toward the center of the machine. The bow S to which the plow beam is pivoted as aforesaid, is sleeved at its respective ends S', on the horizontal portion of the axle B, within the sleeve M, and is provided with a stud T having a friction roller V in position to traverse the vertical cam R and pass from one portion of the face of the latter to the other. The second bearing of the shaft O is elongated laterally to permit the aforesaid oscillation of said shaft.

It is obvious that when the rear of the bow S is raised and the roller V thereby carried upwardly oppositely to the upper part 3 of the face of cam R, the spring N will throw the sleeve M inward, and the pinion P be thereby carried out of engagement with the gear K, and the operation of the seeding mechanism suspended. When the plow is afterward returned to its working position, the roller V is brought down against the lower part 4 of the face of the cam R, and thereby forces the sleeve M outward, compressing the spring N, and carrying the pinion P into engagement with the gear K when, in the onward movement of the machine, the wheel A, through the medium of the gear K, pinion P and shaft O, drives the seeding mechanism. The advantage of this construction is that the cessation of the seeding mechanism is certain to be coincident with the rising and suspension of the action of the plow; and that the subsequent operation of the seeding mechanism is equally certain to begin when the plow has been returned to its working condition. Both operations are automatic and take place without any direct agency, or thought of the driver, in that behalf; also the distance of interval between the front end of the aforesaid rotating shaft and the seeding mechanism carried on the plow, varies with the various positions into which said plow is thrown, both when in use and when suspended. To provide for this variance, and to permit the same, without any binding effect or torsional strain on said rotating shaft, we construct the same of two parts. Shown in detail in Fig. 3. The rear and inner end 6 of said shaft, which is suitably connected with the seeding mechanism within the seed hopper, has a square opening 4 formed longitudinally therein, from the front or free end of said part 6 to almost or quite the seat of the hook formed on the rear extremity of said part 6. Such opening 4 should begin at the front or free end of the section 6, and be of such size and length as to readily receive the front or square portion 5 of said shaft, and to allow the latter to reciprocate freely in said part 6 in the various changes aforesaid of the relative distances of the seeding mechanism and the front end of said shaft O. The front section 5 of said shaft O, having a square formation and fitting loosely into the square opening 4, the rotation of the forward section 5 of said shaft through the medium of the pinion P imparts such rotation to the part 6 of said shaft, and thereby to the seeding mechanism.

By the means described, the length of the shaft O, between its front and rear operative ends, is made automatically changeable as necessity may require, and without any interruption to the operation of the driving or seeding mechanism located, respectively, at the extremities of said shaft. It is obvious that either section of said shaft may play within the other without varying the above result.

What we claim as our invention, and desire to secure by Letters Patent of the United States, is—

1. The combination of the carrying wheel A provided with gear K, suitably supported axle B, the bracket M sleeved upon said axle, and provided with vertical cam R having the variant faces 3, 4, the spring N, shaft O journaled in bracket M, and provided with pinion P, bow S sleeved upon axle B within sleeve M, and provided with stud T and friction roller V, adapted to alternately engage the parts 3. 4. of the face of the cam R, in the vertical oscillations of said bow, and means, substantially as shown, for rocking said bow, for the purpose described.

2. The combination of a driving gear K, the sleeve M provided with a pinion P and irregularly faced cam R, and adapted to slide to and from said gear K, an oscillating arm T adapted to alternately engage the variant parts 3 and 4 of said cam, and a spring N adapted to throw the sleeve M from the gear K when the stud T is opposite the upper part 3 of the outer face of said cam, substantially as shown and for the purpose described.

3. The combination of a driving gear K, a sliding sleeve M provided at its side opposite the said gear with a variant faced cam R, a shaft O, suitably connected at its rear end with seeding mechanism, and journaled at its forward end in said sleeve M, and there provided with a pinion P adapted to be engaged with or disengaged from the gear K in the aforesaid movements of the sleeve M, an oscillating bow S provided with a stud T adapted to be alternately placed against the said variant sections of said cam, and means, substantially as shown, for rocking said bow S in the manner and for the purpose described.

In testimony whereof we affix our signatures in presence of two witnesses.

SIMON A. KERNS.
WILLIAM SEHNERT.

Witnesses:
W. J. KAHLKE,
J. T. FRANCIS.